US012085875B2

(12) United States Patent
Chikugo et al.

(10) Patent No.: US 12,085,875 B2
(45) Date of Patent: Sep. 10, 2024

(54) FIXING APPARATUS INCLUDING SCRAPER FOR REMOVING LUBRICANT

(71) Applicant: CANON KABUSHIKI KAISHA, Tokyo (JP)

(72) Inventors: Youichi Chikugo, Chiba (JP); Rikiya Takemasa, Chiba (JP); Kenichi Tanaka, Ibaraki (JP); Takeshi Kozuma, Tokyo (JP); Hidekazu Tatezawa, Saitama (JP); Taku Ashida, Chiba (JP); Mikihiko Watanabe, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/152,599

(22) Filed: Jan. 10, 2023

(65) Prior Publication Data

US 2023/0229098 A1 Jul. 20, 2023

(30) Foreign Application Priority Data

Jan. 18, 2022 (JP) ................................ 2022-005615
Jan. 18, 2022 (JP) ................................ 2022-005616
Oct. 27, 2022 (JP) ................................ 2022-172751

(51) Int. Cl.
*G03G 15/20* (2006.01)

(52) U.S. Cl.
CPC ..... *G03G 15/2025* (2013.01); *G03G 15/2053* (2013.01)

(58) Field of Classification Search
CPC ....................... G03G 15/2025; G03G 15/2053
See application file for complete search history.

(56) References Cited

U.S. PATENT DOCUMENTS 10,520,868 B1 * 12/2019 Tomita ............... G03G 15/2053
2008/0317522 A1 * 12/2008 Ardery ............... G03G 15/2025 399/329
2009/0208260 A1 * 8/2009 Hasegawa .......... G03G 15/2025 399/325
2011/0008085 A1 * 1/2011 Okamoto ........... G03G 15/2025 399/329
2011/0222908 A1 * 9/2011 Sawahata ........... G03G 15/2025 399/346

(Continued)

FOREIGN PATENT DOCUMENTS

JP 2003195671 A 7/2003

*Primary Examiner* — Sophia S Chen
(74) *Attorney, Agent, or Firm* — Canon U.S.A., Inc. IP Division

(57) ABSTRACT

A fixing apparatus includes a fixing belt that is rotatable and endless, a pad, a pressing rotary member, and a scraping member. The pad contacts an inner circumferential surface of the fixing belt. The pressing rotary member contacts the pad via the fixing belt to form a nip portion. In cooperation with the fixing belt, the pressing rotary member fixes a toner image to a recording material by applying heat and pressure to the recording material at the nip portion. A lubricant is applied to the inner circumferential surface of the fixing belt. The scraping member includes an inclined portion inclined downward toward an outer side of the fixing belt and contacting an edge portion of the fixing belt to scrape the lubricant. The inclined portion is in contact with the edge portion of the fixing belt in an area where an outer surface of the fixing belt faces upward.

15 Claims, 12 Drawing Sheets

(56) References Cited

U.S. PATENT DOCUMENTS

| | | | | |
|---|---|---|---|---|
| 2012/0107027 | A1* | 5/2012 | Barton ............... | G03G 15/2025 399/325 |
| 2021/0405559 | A1* | 12/2021 | Kozuma ............ | G03G 15/2053 |

* cited by examiner

FIXING APPARATUS INCLUDING SCRAPER FOR REMOVING LUBRICANT

BACKGROUND

Field

The present disclosure relates to a fixing apparatus which fixes a toner image to a recording material.

Description of the Related Art

An image forming apparatus includes a fixing apparatus for fixing an unfixed toner image on a recording material to the recording material.

A fixing apparatus including a heating roller having a heat source for heating an unfixed toner image, a rotatable endless fixing belt to which heat from the heating roller is applied, and a pressure roller for pressurizing the fixing belt has been known (Japanese Patent Application Laid-Open No. 2003-195671). The fixing apparatus which includes the fixing belt further includes a steering roller that adjusts a position of the fixing belt in a width direction of the fixing belt. The heating roller and the steering roller are arranged on a side of an inner circumferential surface of the fixing belt, and the fixing belt is stretched therearound. The pressure roller is positioned on a side of the outer circumferential surface of the fixing belt, and forms a nip portion with the fixing belt by pressurizing a pad member via the fixing belt. A recording material which bears an unfixed toner image is conveyed to the nip portion where the recording material receives heat and pressure while being held between and conveyed through the nip portion, so that the toner image is fixed to the recording material.

Because the fixing apparatus generates a great pressurizing force at the nip portion, a configuration is known where sliding resistance is reduced by application of a lubricant to the inner circumferential surface of the fixing belt. There is a possibility that the lubricant adhering to the inner circumferential surface of the fixing belt flows into the outer circumferential surface of the fixing belt by the lubricant being pressurized at the nip portion. The fixing apparatus includes a receiving member for receiving the lubricant flowing into the outer circumferential surface, so that it is possible to prevent contamination of an interior and an exterior of the fixing apparatus caused by the lubricant or adhesion of the lubricant to a recording material.

In the above-described fixing apparatus, the pressurizing force is generated by the pad member and the pressure roller. Thus, a force which makes the lubricant applied to the inner circumferential surface of the fixing belt be pushed out of the inner circumferential surface of the fixing belt acts on the lubricant.

As a result, the lubricant pushed out of the inner circumferential surface of the fixing belt flows into the outer surface of the fixing belt. There is a risk that the lubricant flowing into the outer surface of the fixing belt adheres to a recording material passing through the nip portion to cause lowering of image quality.

SUMMARY

The present disclosure is directed to a fixing apparatus which prevents the lowering of image quality by preventing a lubricant from flowing into the outer surface of the fixing belt.

Further, the present disclosure is directed to a fixing apparatus which prevents lowering of image quality caused by a lubricant.

According to an aspect of the present disclosure, a fixing apparatus includes a rotatable endless belt, a pad configured to come in contact with an inner circumferential surface of the rotatable endless belt, a pressing rotary member configured to come in contact with the pad via the rotatable endless belt to form a nip portion, wherein, in cooperation with the rotatable endless belt, the pressing rotary member applies heat and pressure to a recording material which bears a toner image at the nip portion to fix the toner image to the recording material, and wherein a lubricant is applied to the inner circumferential surface of the rotatable endless belt, and a scraping member configured to scrape the lubricant by being in contact with an edge portion of the rotatable endless belt in a width direction, wherein the scraping member includes an inclined portion inclined downward toward an outer side of the rotatable endless belt in the width direction, and wherein the inclined portion is in contact with the edge portion of the rotatable endless belt in an area where an outer surface of the rotatable endless belt faces upward.

Further features of the present disclosure will become apparent from the following description of exemplary embodiments with reference to the attached drawings.

DESCRIPTION OF THE EMBODIMENTS

<Image Forming Apparatus>

A configuration of an image forming apparatus 100 according to one exemplary embodiment will be schematically described with reference to FIG. 1.

Figure 1:
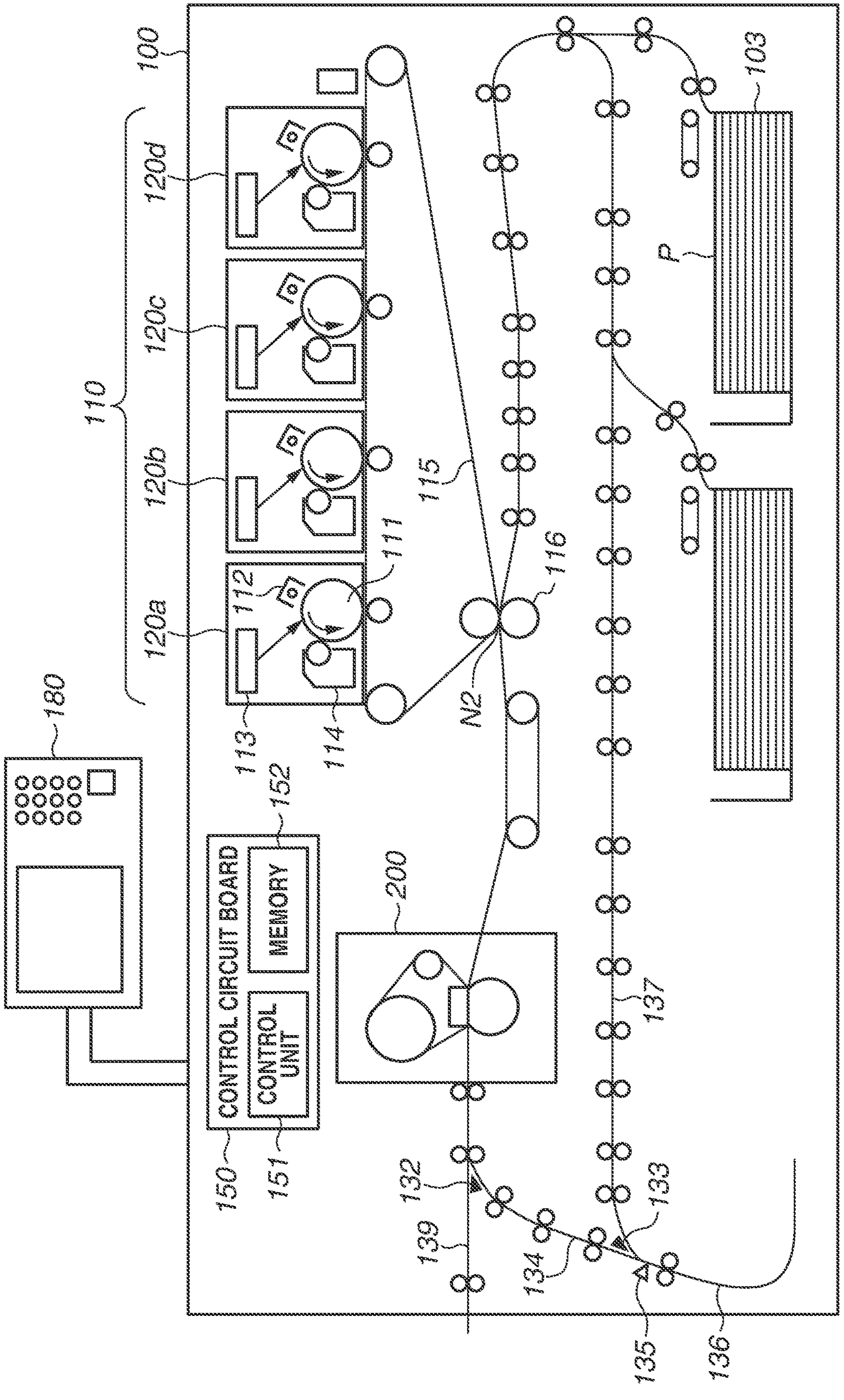
FIG. 1 is a schematic cross-sectional diagram of an image forming apparatus according to one exemplary embodiment.

FIG. 1 is a diagram illustrating a full-color image forming apparatus according to the present exemplary embodiment. The image forming apparatus 100 includes four image forming units 110, i.e., a yellow image forming unit 120*a*, a magenta image forming unit 120*b*, a cyan image forming unit 120*c*, and a black image forming unit 120*d*, which are arranged in a moving direction of an intermediate transfer belt 115. First, processing for forming a toner image on the intermediate transfer belt 115 will be described using the yellow image forming unit 120*a* as an example.

In FIG. 1, a surface of a rotationally-driven photosensitive drum 111 is uniformly charged by a charging device 112 (i.e., charging). Then, based on received image data, an exposure device 113 emits laser light to the surface of the photosensitive drum 111, so that an electrostatic latent image is formed on the surface of the photosensitive drum 111 (exposure). Thereafter, a yellow toner image is formed on the photosensitive drum 111 by a development device 114. A primary transfer roller applies a voltage having a polarity opposite to a polarity of an electric potential of the yellow toner image to the intermediate transfer belt 115. Thus, the yellow toner image formed on the photosensitive drum 111 is transferred to the intermediate transfer belt 115 (primary transfer). Further, yellow toner remaining on the surface of the photosensitive drum 111 is scraped and removed from the photosensitive drum 111 by a toner cleaner. The above-described series of processes is similarly executed by the magenta image forming unit 120*b*, the cyan image forming unit 120*c*, and the black image forming unit 120*d*. As a result, a full-color toner image is formed on the intermediate transfer belt 115.

The toner image formed on the intermediate transfer belt 115 is conveyed to a secondary transfer portion N2 formed by secondary transfer rollers 116. At a timing in synchronization with a conveyance timing of the toner image, a recording material P is taken out from a recording material cassette 103 and conveyed to the secondary transfer portion N2 one by one. Then, the toner image formed on the intermediate transfer belt 115 is transferred to the recording material P (secondary transfer).

The recording material P on which the toner image is transferred is conveyed to a fixing apparatus 200, so that the fixing apparatus 200 fixes the toner image by applying heat and pressure thereto (fixing). The recording material P with the fixed toner image is discharged to a discharge tray.

The image forming apparatus 100 can also execute black-and-white image forming processing. When a black-and-white image is formed, the image forming apparatus 100 drives only the black image forming unit 120*d* among the plurality of image forming units 110.

In a case where images are formed on both sides of the recording material P, the recording material P is guided to a conveyance path 134 by a flapper 132 arranged inside the image forming apparatus 100 after a toner image is transferred and fixed to a first image forming surface thereof (i.e., first surface). Then, the recording material P is conveyed to a reversing portion 136.

When a reversing sensor 135 detects a trailing end of the recording material P, a flapper 133 changes a conveyance direction of the recording material P to a direction heading toward a reversing path 137. The image forming apparatus 100 conveys the reversed recording material P to the image forming units 110 via the reversing path 137 again, and further conveys the recording material P to the fixing apparatus 200. After printing is executed on both sides of the recording material P, the recording material P is guided to a discharge path 139 by the flapper 132 and discharged to the outside.

The series of processing starting from charging to discharge of the recording material P with a fixed toner image to the discharge tray, is called image forming processing (print job). Further, an execution period of the image forming processing is called an image forming processing period (print job period).

An operation unit 180 includes a display screen and a selection key. The operation unit 180 displays a state of the image forming apparatus 100 on the display screen, and receives an operation instruction from an operator (user) via the selection key.

A control circuit board 150 includes a control unit 151 and a memory 152, and controls the above-described units included in the image forming apparatus 100. Based on detection signals received from various sensors and information stored in the memory 152, the control unit 151 outputs output signals to electric components to operate the electric components at a desired timing with a necessary control amount. Thus, these electric components are practically controlled by the control unit 151. The memory 152 stores information data necessary to control the units, and the control unit 151 reads and writes the information data stored in the memory 152.

<Fixing Apparatus>

Figure 2:
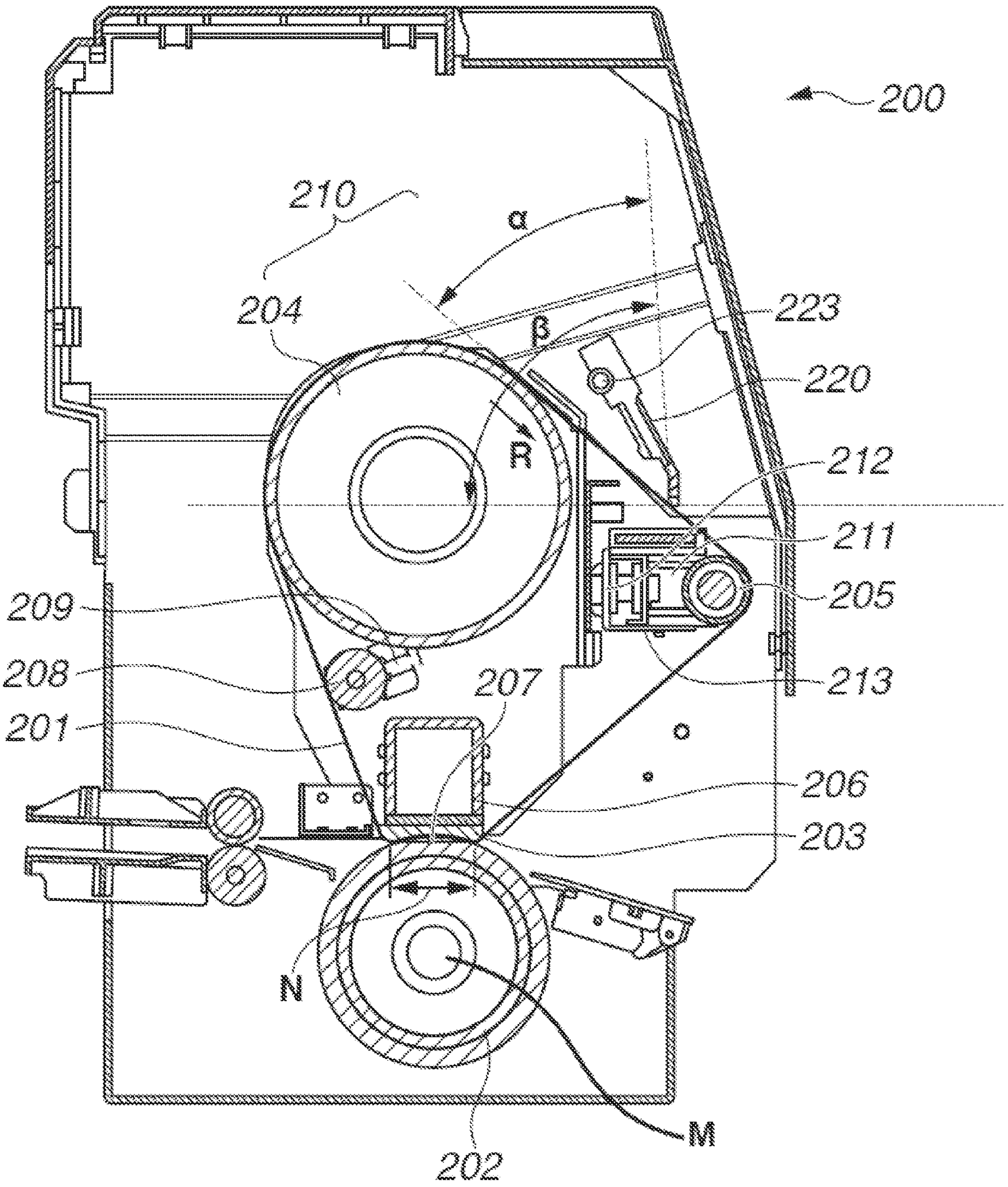
FIG. 2 is a schematic cross-sectional diagram of a fixing apparatus according to one exemplary embodiment.
Figure 3:
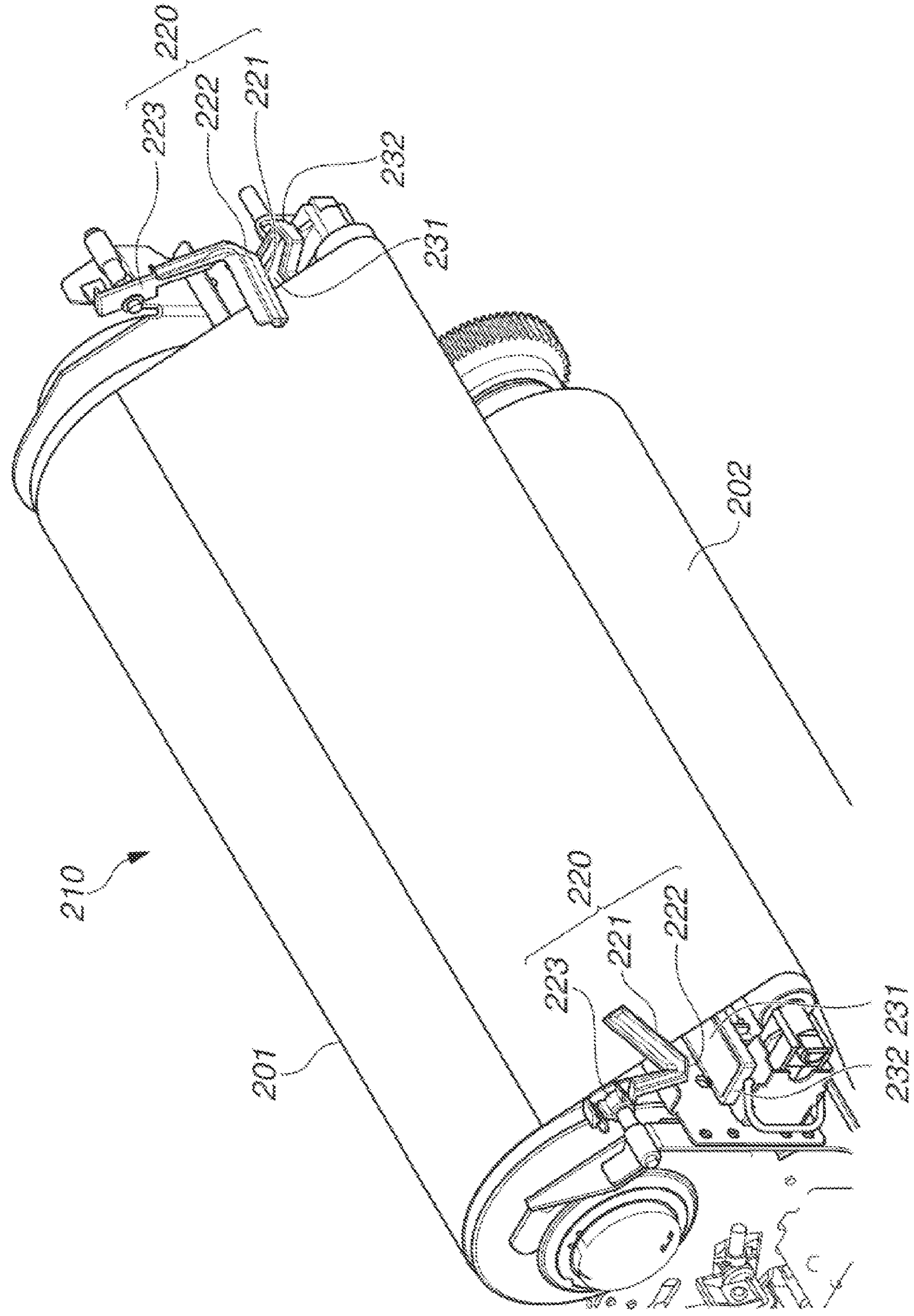
FIG. 3 is a perspective diagram of the fixing apparatus according to one exemplary embodiment.

A configuration of the fixing apparatus 200 according to the present exemplary embodiment will be described in detail with reference to FIGS. 2 and 3. FIG. 2 and FIG. 3 are a cross-sectional diagram and a partial perspective diagram, respectively, of the fixing apparatus 200 according to the present exemplary embodiment of the present disclosure. A general configuration of the belt heating type fixing apparatus 200 according to the present exemplary embodiment is schematically illustrated in FIG. 2. The recording material P is conveyed from right to left on the drawing surface of FIG. 2. The fixing apparatus 200 includes a heating unit 210 having a heat source, and a pressurizing rotary body (hereinafter, called "pressure roller") 202 which forms a nip portion N with the heating unit 210. The heating unit 210 includes a rotatable endless fixing belt (hereinafter, called "belt") 201 serving as a heating rotary body, a pad member (hereinafter, called "pad") 203 serving as a fixing member, a heating roller 204, and a steering roller 205.

The belt 201 is a thin cylindrical-shaped member having thermal conductivity and heat resistance. In the present exemplary embodiment, the belt 201 has a three-layer structure consisting of a base layer, an elastic layer formed on the outer circumference of the base layer, and a release layer formed on the outer circumference of the elastic layer. The base layer is made of polyimide (PI) resin and has a thickness of 60 μm. The elastic layer is made of silicon rubber and has a thickness of 300 μm. The release layer is made of a copolymer of tetrafluoroethylene and perfluoroalkoxy-ethylene (PFA) resin as fluororesin and has a thickness of 30 μm. Then, the belt 201 is stretched around the pad 203, the heating roller 204, and the steering roller 205.

The pad 203 is a member which forms the nip portion N of a predetermined width in the conveyance direction of the recording material P by being pressed against and in contact with the pressure roller 202 via the belt 201. The pad 203 is a long member having an approximately rectangular-shaped cross sectional face, arranged in the width direction of the belt 201. Liquid crystal polymer (LCP) resin is used for the pad 203 because the pad 203 has to be made of a material having heat resistance.

A sliding sheet 207 whose surface is coated with polytetrafluoroethylene (PTFE) and silicon oil S (hereinafter, called "oil S") which functions as a lubricant are arranged between the pad 203 and the belt 201, so that the belt 201 can smoothly slide over the pad 203.

The sliding sheet 207 is formed of a polyimide base member having a thickness of 70 μm, and a surface thereof is coated with PTFE. Although the sliding sheet 207 is arranged in order to improve sliding performance of the pad 203 and the belt 201, a coating for improving the sliding performance can be applied on a surface layer of the pad 203 instead of using the sliding sheet 207.

An oil supply roller 208 is formed of a roll-shape member, and nonwoven fabric having a thickness of 100 μm, impregnated with silicon oil, is wound around the roll-shape member. The oil supply roller 208 is pressed by a pressing spring 209 with a force of 3.0 N to be in contact with the inner surface of the belt 201, and is also rotatably supported by a frame of the heating unit 210.

The oil S that is applied as a lubricant between the pad 203 and the belt 201 is deteriorated and also decreased by leaking outside while the fixing apparatus 200 is being operated. When the oil S applied between the pad 203 and the belt 201 cannot be retained, sliding friction between the pad 203 and the belt 201 is increased to cause an issue such as a rotation failure of the belt 201. By the oil supply roller 208 being in contact with the belt 201, the oil S can be supplied to the inner circumferential surface of the belt 201. With this configuration, the oil S supplied to the belt 201 and the pad 203 (sliding sheet 207) can be maintained for a longer period of time, so that the fixing apparatus 200 can be operated stably.

A stay 206 is arranged on the inner side of the belt 201. The stay 206 is arranged on the inner side of the pad 203, opposite to a side of the sliding sheet 207. The stay 206 is a reinforcing member longer in the width direction of the belt 201 and having rigidity for supporting the pad 203 from a rear side thereof. A drawn material made of Steel Use Stainless (SUS) 304 and having a thickness of 3 mm is used as the material of the stay 206, which is formed so that a cross-section thereof has a hollowed square shape to ensure the strength of the stay 206. When the pressure roller 202 presses the pad 203 against the stay 206, the stay 206 provides strength to the pad 203 to ensure the pressurizing force generated at the nip portion N. In addition, a material other than the stainless steel can be used for the stay 206 as long as the strength can be ensured thereby.

The heating roller 204 is made of a stainless pipe having a thickness of 1 mm, and a halogen heater (not illustrated) is arranged inside thereof. Thus, the heating roller 204 can be heated to a predetermined temperature. The belt 201 is heated by the heating roller 204, and based on a temperature detected by a thermistor, a temperature of the belt 201 is controlled to a predetermined target temperature depending on a paper type. Further, the heating roller 204 may be rotationally driven. By rotationally driving the heating roller 204, tension of the belt 201 from the nip portion N to the heating roller 204 can be increased in the rotation direction of the belt 201. With this configuration, a curvature at an exit of the nip portion N in the rotation direction of the belt 201 can be increased, so that releasing performance of the recording material P can be improved.

The steering roller 205 stretches the belt 201, and is supported by a steering frame 213. The steering frame 213 rotationally moves with respect to the frame of the heating unit 210 about a rotation shaft 212 as a fulcrum, so that the steering roller 205 changes alignment thereof with respect to other stretching members. With this configuration, the steering roller 205 controls a position of the belt 201 in the width direction of the belt 201. The steering roller 205 is urged by a spring 211 supported by the steering frame 213, so that the steering roller 205 also functions as a tension roller for applying predetermined tension to the belt 201. An axis direction of the rotation shaft 212 is the same as the conveyance direction of the recording material P. Thus, the steering roller 205 is rotationally moved in T directions on a drawing surface of FIG. 4. In other words, at least one end of the steering roller 205 is moved toward the lower side and the upper side in the vertical direction.

The steering roller 205 further functions to prevent occurrence of gloss unevenness caused by an edge surface of the recording material P. In the present exemplary embodiment, a force of approximately 2000 N is applied to the belt 201 at the nip portion N. When unfixed toner is fixed to the recording material P, a stress imposed on a portion where the belt 201 is in contact with the edge surface of the recording material P is greater than a stress imposed on a portion where the belt 201 is not in contact with the edge surface thereof. An area where the edge surface of the recording material P has repeatedly passed through is dented when compared to an area not in contact with the edge surface. A dent caused by the edge surface of the recording material P, formed on the surface of the belt 201, is called a paper edge flaw.

When unfixed toner is to be fixed to the recording material P, the fixing apparatus 200 applies pressure and heat to the recording material P. At this time, a surface condition of the belt 201 is reflected on glossiness of an image surface after fixing. When the belt 201 has an uneven surface, the unevenness is reflected on the glossiness of the image surface, so that unevenness (gloss unevenness) occurs in the glossiness of the image surface. Accordingly, when unfixed toner is fixed to the recording material P in a state where the surface of the belt 201 has a paper edge flaw, a linear-shape gloss unevenness occurs on the image surface. Thus, in the present exemplary embodiment, in order to prevent creation of the paper edge flaw on the surface of the belt 201, the belt 201 is reciprocated in the width direction.

A position of the belt 201 in the width direction is detected by a position detection unit (not illustrated). An arm projected toward the inner side from the outer side of the belt 201 in the width direction is arranged at an end portion of the belt 201. A position of the belt 201 in the width direction can be grasped by detecting a position of the arm by a sensor such as a photo interrupter. In order to precisely detect the position of the belt 201 in the width direction, the arm applies force to the belt 201 in a direction toward the inner side from the outer side of the belt 201 in the width direction. Further, in order to apply the force in that direction, a rotation axis of the arm is orthogonal to the width direction. Thus, the arm which detects the position of the belt 201 in the width direction is rotationally moved in the width direction about the above-described rotation axis as a center. By detecting the position of the belt 201 in the width direction, it is possible to prevent the belt 201 from coming off from the members for stretching the belt 201 (i.e., the pad 203, the heating roller 204, and the steering roller 205). Further, in order to prevent creation of the paper edge flaw, the belt 201 can actively be moved in the width direction.

The pressure roller 202 is a roller including an elastic layer formed on the outer circumference of a shaft, and a release layer formed on the outer circumference of the elastic layer. The shaft is made of stainless steel. The elastic layer is made of conductive silicon rubber and has a thickness of 5 mm. The release layer is made of PFA as fluororesin and has a thickness of 50 μm. The pressure roller 202 is axially supported by a fixing frame of the fixing apparatus 200. A gear is fixed to one end portion of the pressure roller 202, so that the pressure roller 202 is connected to a driving source M via the gear and driven rotationally. The belt 201 is held between the rotating pressure roller 202 and the pad 203, and driven in a direction R.

As described above, the pad 203, the heating roller 204, and the steering roller 205 are arranged on a side of the inner circumferential surface of the belt 201, and the belt 201 is stretched therearound. The belt 201 is held between the pressure roller 202 and the pad 203 and driven and rotated when the pressure roller 202 rotates. The belt 201 stores heat from the heating roller 204. A recording material P that bears an unfixed toner image is held and conveyed by the pressure roller 202 and the belt 201 at the nip portion N, and receives heat and pressure necessary for fixation of the toner image. Thus, the toner image is fixed to the recording material P.

<Degradation of Image Quality Caused by Lubricant>

A lubricant, i.e., the oil S, is used in the fixing apparatus 200 including the belt 201 described in the present exemplary embodiment. The oil S is applied to the inner circumferential surface of the belt 201. Since the pressure is generated by the pad 203 and the pressure roller 202 at the nip portion N, a force which makes the oil S be pushed out of the inner circumferential surface of the belt 201 acts on the oil S applied to the inner circumferential surface of the belt 201.

Thus, the oil S is exposed to an area outside the belt 201 in the width direction.

Further, in the present exemplary embodiment, the belt 201 is reciprocated in the width direction by the steering roller 205. Thus, there is a risk that the oil S adheres to the outer surface of the belt 201 in a case where the oil S is exposed to the area outside the belt 201. Because the belt 201 is rotated in the R direction in FIG. 2, the oil S adhering to the outer surface of the belt 201 reaches the nip portion N. Then, if the oil S adheres to the recording material P conveyed to the nip portion N, an image defect occurs in an area where the oil S has adhered to. Therefore, it is necessary to prevent adhesion of the oil S to the area of the belt 201 which comes in contact with the recording material P.

In the present exemplary embodiment, in order to prevent the oil S from flowing into the outer surface of the belt 201, collection mechanisms 220 are used. Details of the collection mechanisms 220 are described below.

<Collection Mechanism>

Figure 4:
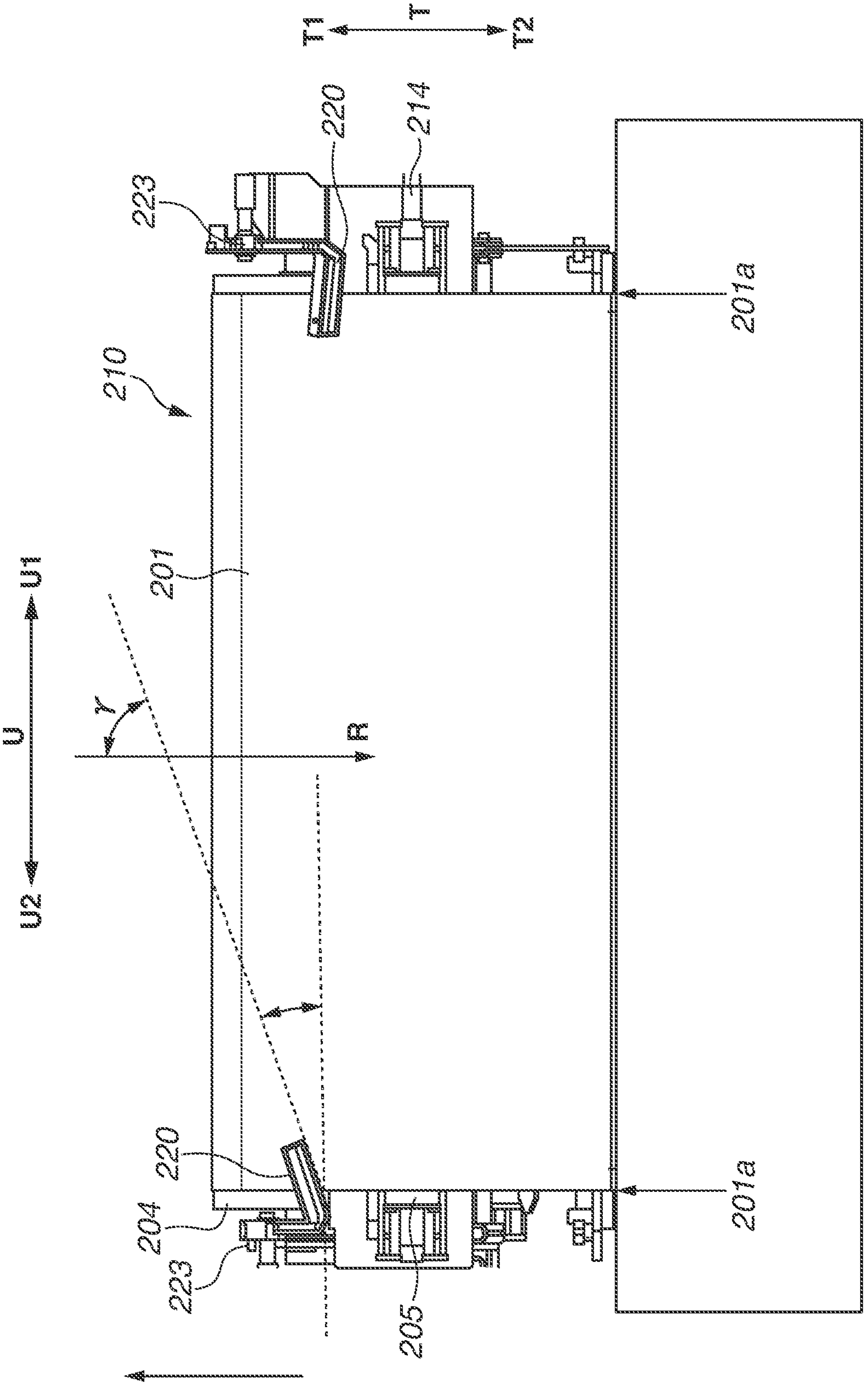
FIG. 4 is a diagram illustrating the fixing apparatus according to one exemplary embodiment viewed in a conveyance direction.

The collection mechanisms 220 according to the present exemplary embodiment will be described with reference to FIGS. 3 and 4. FIG. 3 is a perspective diagram of the fixing apparatus 200, and FIG. 4 is a diagram illustrating the fixing apparatus 200 viewed in the conveyance direction of the recording material P.

The collection mechanisms 220 are arranged at both end portions in the width direction of the belt 201. While a collection mechanism 220 being arranged at one of the end portions is possible, the oil S leaking from the both end portions of the belt 201 can be collected if the collection mechanisms 220 are arranged at the both end portions thereof. Thus, it is desirable that the collection mechanisms 220 be arranged at the both end portions of the belt 201. Each of the collection mechanisms 220 includes a scraping member 221 which is in contact with the end portion of the belt 201, a drip member 222 which allows the oil S to drip down, and a supporting member 223 which enables the scraping member 221 to follow reciprocal movement of the belt 201.

Scraping members 221 and drip members 222 are arranged between the heating roller 204 and the steering roller 205 in the rotation direction of the belt 201. The scraping members 221 and the drip members 222 can rotate in the T directions indicated by a two-headed arrow in FIG. 4 about respective supporting members 223 as rotation axes. An axis direction of each of the supporting members 223 is parallel to the rotation axis direction of the heating roller 204. Each of the scraping members 221 applies force to the belt 201 in a direction toward a side of the inner circumferential surface of the belt 201 from a side of the outer circumferential surface thereof. Further, the scraping members 221 according to the present exemplary embodiment are in contact with edge portions 201*a* on the outer surface side of the belt 201. By coming into contact with the edge portions 201*a* on the outer surface side of the belt 201, the scraping members 221 can scrape off the oil S leaking from the inner circumferential surface of the belt 201.

A direction of the force applied to the belt 201 from each of the scraping members 221 will be described in detail. The scraping member 221 uses the supporting member 223 as a rotation axis to apply force, to the belt 201, in a direction toward the inner circumferential surface side from the outer circumferential surface side of the belt 201. When the scraping members 221 apply the force to the belt 201, the force is to include a component of force caused by the scraping members 221 in a direction toward the inner circumferential surface side from the outer circumferential surface side. Thus, the scraping members 221 can be brought into contact with the edge portions 201*a* of the belt 201 from the outer circumferential surface side of the belt 201.

Meanwhile, in a case where the scraping member 221 applies force to the belt 201 in a direction toward the outer surface side from the side of the inner circumferential surface of the belt 201, the scraping member 221 can scrape the oil S. Thus, it is possible to prevent the oil S leaking to the outer surface of the belt 201. However, at the same time, the scraping member 221 can also act as a path through which the oil S applied to the inner circumferential surface of the belt 201 is exposed to the outer surface of the belt 201. As a result, retention of the oil S on the inner circumferential surface of the belt 201 may be hindered. The same can be said for a case where the scraping member 221 applies force to the edge portions 201*a* of the belt 201 in a direction orthogonal to the conveyance direction of the recording material P. Thus, in a case where the scraping members 221 applies force to the belt 201, it is desirable that a component of the force in the direction toward the side of the inner circumferential surface from the side of the outer circumferential surface of the belt 201 be included in components of the direction of the force.

Figure 5B:
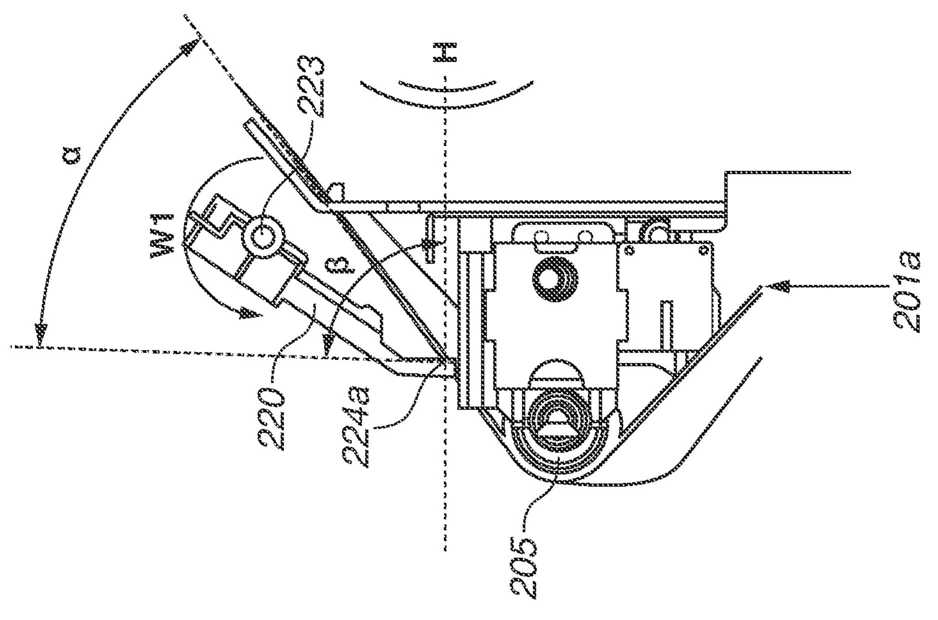
FIGS. 5A and 5B are diagrams illustrating one end of a heating unit according to one exemplary embodiment.
Figure 5A:
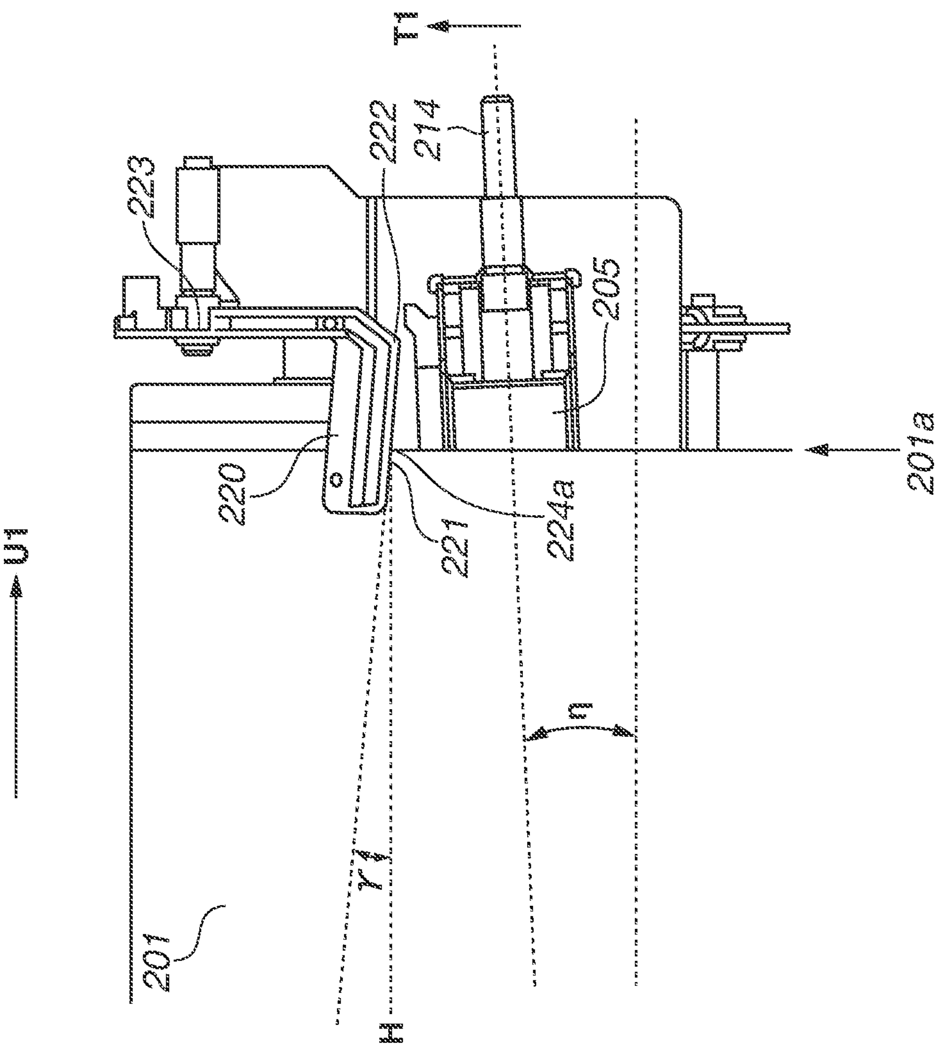

An angle at which the scraping member 221 is in contact with the belt 201 will be described with reference to FIGS. 5A and 5B. FIG. 5A is a diagram illustrating the belt 201 and the collection mechanism 220 viewed in the conveyance direction, and FIG. 5B is a cross-sectional diagram illustrating the belt 201, the steering roller 205, and the collection mechanism 220 viewed in the width direction orthogonal to the conveyance direction. In FIG. 5B, when the belt 201 and the collection mechanism 220 are viewed in the width direction, an angle is formed between the belt 201 and the scraping member 221. When a point where the belt 201 intersects with the scraping member 221 is specified as a reference, an angle $\alpha$ (hereinafter, referred to as a first angle) is formed between the outer surface of the belt 201 on the upstream side in the rotation direction R of the belt 201 and the scraping member 221. It is desirable that the first angle be 0° or more and 90° or less. Further, a line H is drawn in the horizontal direction from the point where the belt 201 intersects with the scraping member 221. When the point where the belt 201 intersects with the scraping member 221 is specified as a reference, an angle $\beta$ (hereinafter, referred to as a second angle) is formed between the line H on the upstream side in the rotation direction of the belt 201 and the scraping member 221. It is desirable that the second angle be 0° to 180°. By satisfying the above-described angle relationship, the oil S leaking out of the inner circumferential surface of the belt 201 can be brought back to the inner side of the belt 201.

As illustrated in FIG. 4, in the present exemplary embodiment, parts of the collection mechanisms 220 are arranged on the outer sides of the belt 201 in the width direction. Each of the collection mechanisms 220 includes the drip member 222 on the outer side of the belt 201 as described above. The drip member 222 is positioned on the lower side in the vertical direction of a portion where the scraping member 221 is in contact with the belt 201. Thus, the collection mechanism 220 has a shape inclined downward toward the drip member 222 from the portion where the scraping member 221 is in contact with the belt 201. When the collection mechanism 220 is viewed in the conveyance direction, an angle γ (hereinafter, referred to as a third angle) is formed between the scraping member 221 and the line H horizontally drawn from the portion where the belt 201 is in contact with the scraping member 221. The scraping member 221 is in contact with the belt 201 to make the third angle be 0° to 90°. With this configuration, the oil S scraped by the scraping member 221 can be moved toward the outer side of the belt 201 in the width direction by gravity.

By arranging the drip member 222 at a position on the outer side of the belt 201 in the width direction and on the lower side in the vertical direction of the contact portion between the scraping member 221 and the belt 201, it is possible to allow the oil S scraped by the scraping member 221 to drip down on the outer side of the belt 201 in the width direction. In this case, the oil S can easily be collected if the scraping member 221 is connected with the drip member 222 by an inclined plane.

Because of the above-described positional relationship between the scraping member 221 and the drip member 222, the oil S collected by the scraping member 221 tends to be concentrated on the drip member 222. Since the drip member 222 is a part where the scraped oil S is concentrated on and allowed to drip down to, it is desirable that the drip member 222 have a shape such as an angular shape or a projecting shape on which the oil S can be concentrated.

<Receiving Members>

Figure 9:
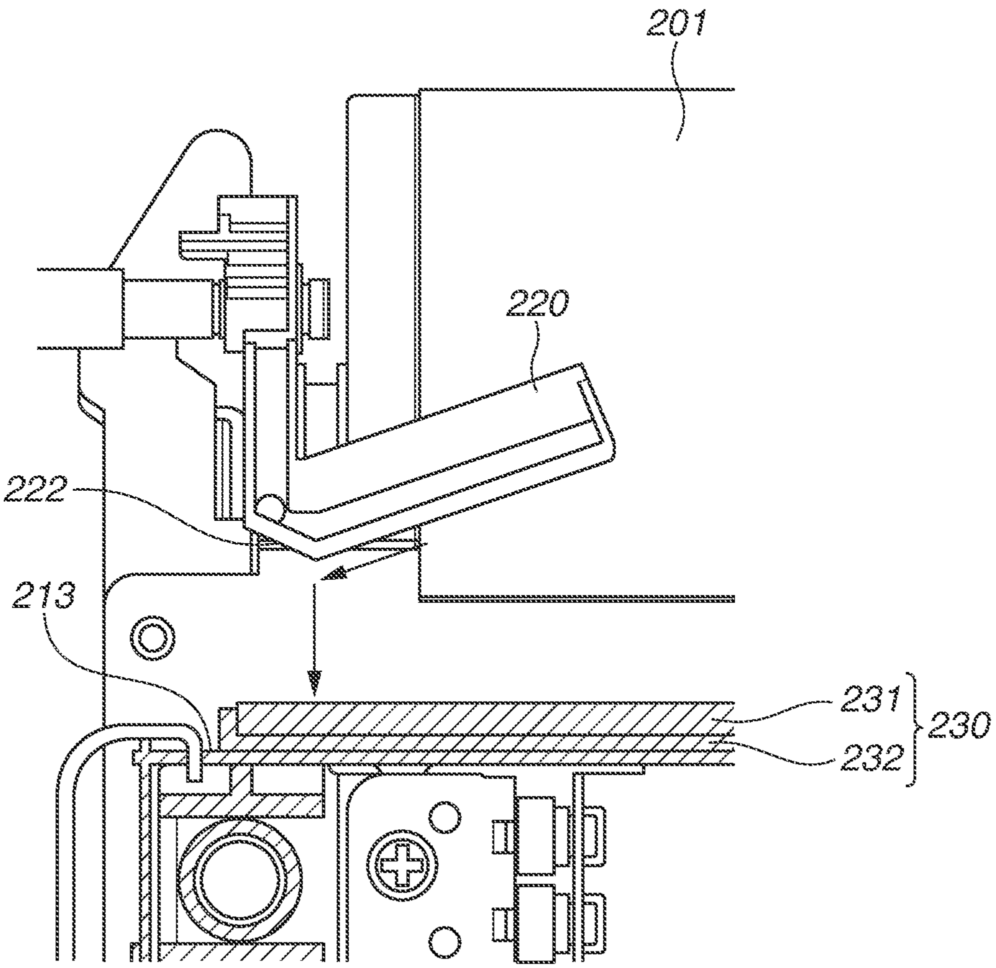
FIG. 9 is a schematic diagram illustrating one end of the heating unit including a receiving member according to one exemplary embodiment.
Figure 10:
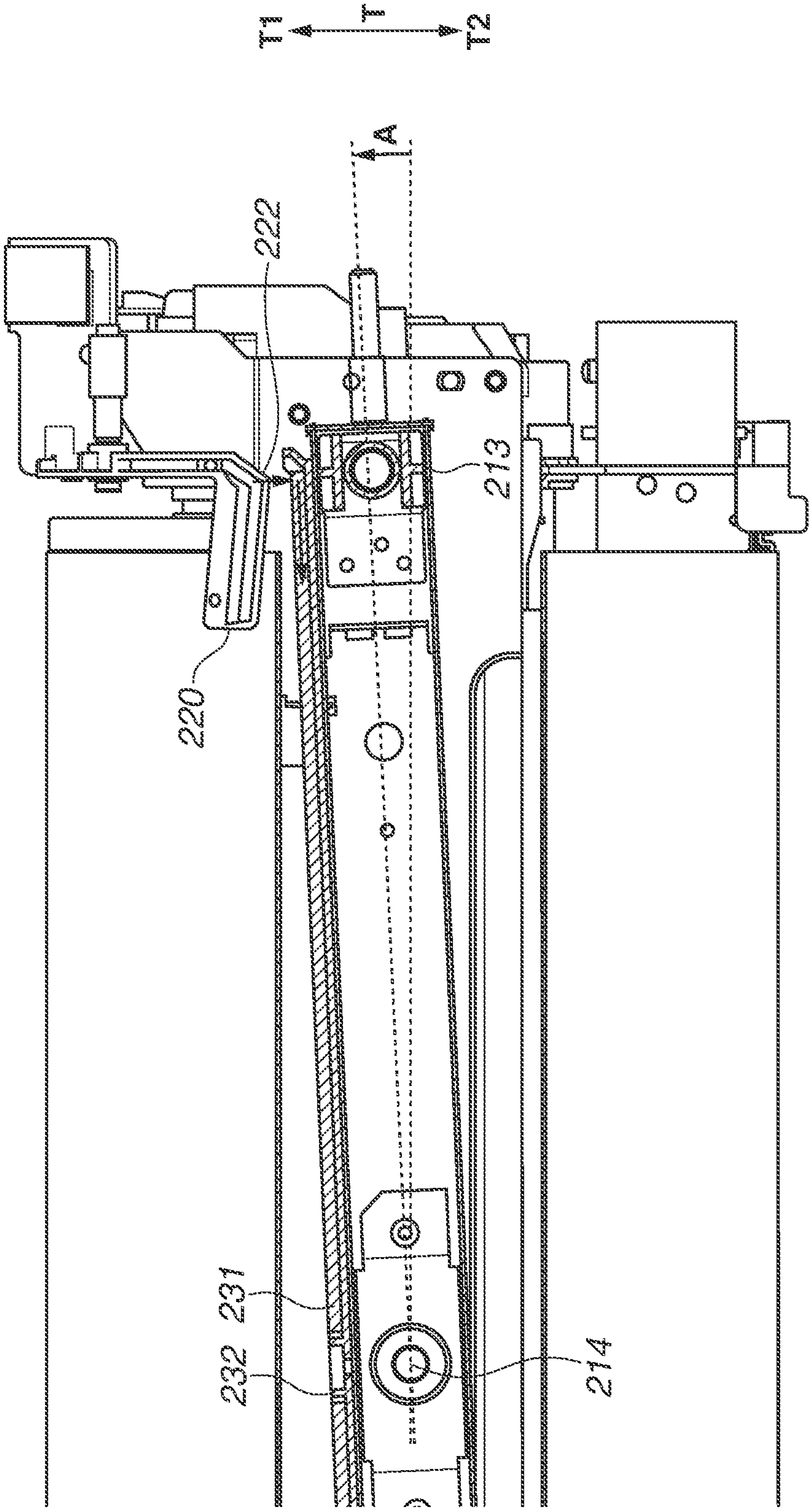
FIG. 10 is a cross-sectional diagram illustrating the heating unit according to one exemplary embodiment viewed in a conveyance direction.
Figure 11:
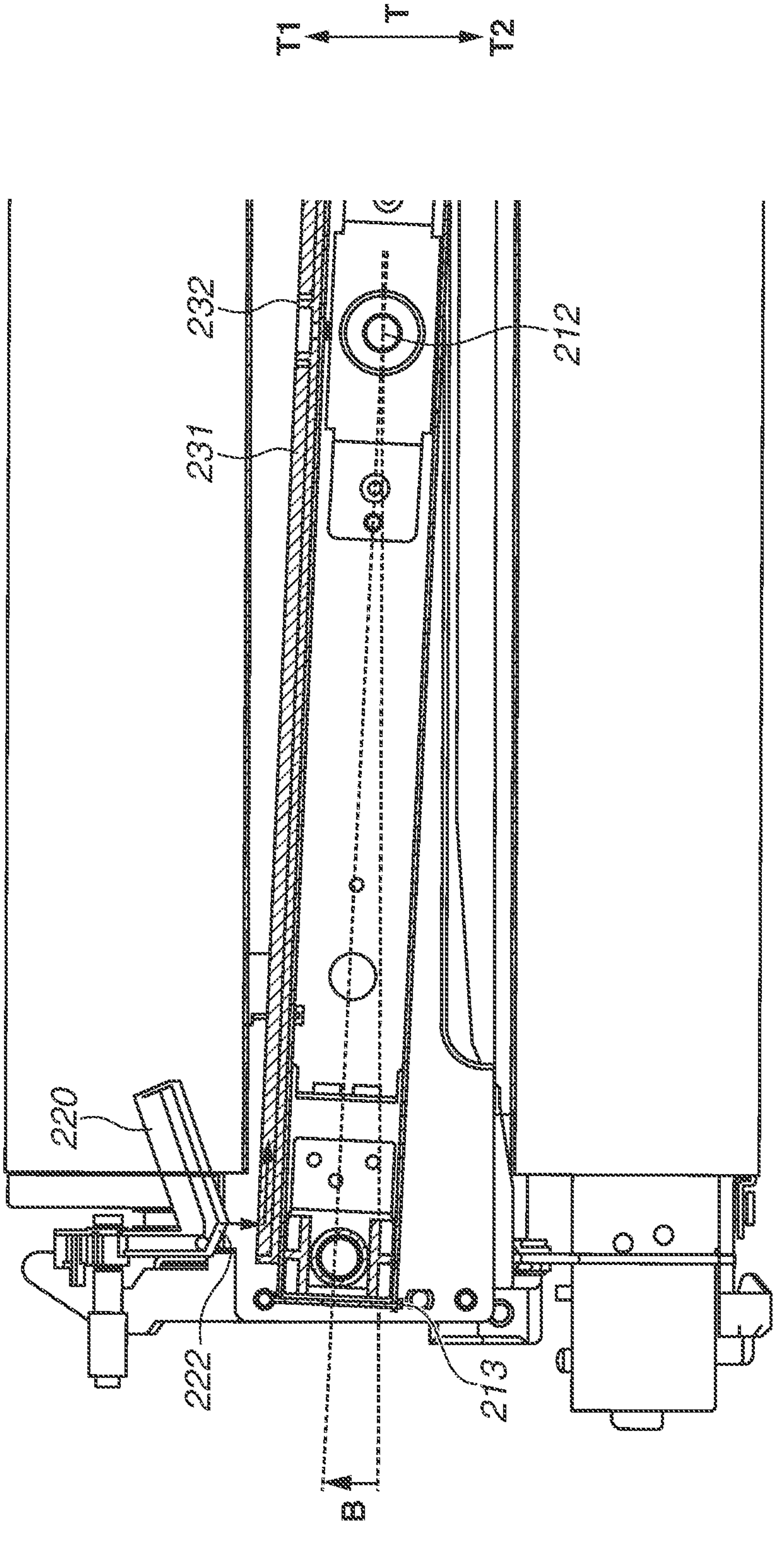
FIG. 11 is a cross-sectional diagram illustrating the heating unit according to one exemplary embodiment viewed in the conveyance direction.

A receiving member 230 according to the present exemplary embodiment will be described. FIG. 9 is a schematic diagram illustrating one end of the heating unit 210 viewed in the conveyance direction. FIGS. 10 and 11 are cross-sectional diagrams illustrating the heating unit 210 including the receiving member 230 viewed in the conveyance direction. The receiving member 230 for receiving the oil S is arranged on the lower side in the vertical direction of the drip member 222. Specifically, the receiving member 230 includes an oil pan 232 and a felt member 231. The oil pan 232 is formed into a dish shape, and the felt member 231 is fit into the oil pan 232. The receiving member 230 is placed on the steering frame 213 that supports the steering roller 205, and fixed thereto with a screw.

The receiving member 230 is a member for receiving the oil S dripping from the scraping member 221 and the drip member 222. Thus, the receiving member 230 is arranged on the lower side in the vertical direction of the scraping member 221 and the drip member 222, or in a direction the oil S drips down. Further, in the present exemplary embodiment, the scraping members 221 and the drip members 222 are arranged at both end portions of the belt 201 in the width direction. Thus, receiving members 230 are also arranged at the both end portions of the belt 201. Thus, at least parts of the receiving members 230 are arranged on the outer sides of the belt 201 in the width direction and on the lower side in the vertical direction of the scraping members 221 and the drip members 222 at the both end portions of the belt 201. By the receiving members 230 being arranged at the above-described positions, the dripping oil S can be received. Further, when the fixing apparatus 200 is viewed in the width direction orthogonal to the conveyance direction of the recording material P, each of the receiving members 230 is arranged on the inner side of the belt 201. The oil S scraped by the scraping member 221 is guided to the inner side of the belt 201. Thus, when the fixing apparatus 200 is viewed in the width direction, the oil S drips down from the inner side of the belt 201. The receiving member 230 arranged on the inner side of the belt 201 can receive the oil S dripping from the inner side of the belt 201 in the area on the inner side of the belt 201. Thus, it is possible to reduce a risk that the dripping oil S adheres to a component other than the receiving member 230. For example, in a case where the receiving member 230 is arranged on the outer side of the belt 201 when the fixing apparatus 200 is viewed in the width direction, the dripping oil S has to pass through the belt 201 once before reaching the receiving member 230. Because the oil S cannot always pass through the belt 201 without adhering thereto, it is desirable that the receiving member 230 be arranged on the inner side of the belt 201 when viewed in the width direction.

In the present exemplary embodiment, the felt member 231 is included in the receiving member 230. However, the configuration is not limited thereto. A member different from the felt member 231 can be used as long as the oil S can be collected thereby. For example, a member made of nonwoven fabric can also be used.

Normally, each of the receiving members 230 receives the oil S dripping down from the scraping member 221 and the drip member 222. Thus, the oil S is received by the same area of the receiving member 230. As a result, there is a risk that the oil S flows over the receiving member 230 even though the receiving member 230 still has some other areas for receiving the oil S because the oil S remains in the same area of the receiving member 230. Thus, in the present exemplary embodiment, the receiving members 230 are placed on the steering frame 213. Thus, the receiving members 230 are moved when the steering roller 205 rotationally moves about the rotation shaft 212 as a fulcrum. With this configuration, the receiving members 230 can efficiently receive the oil S. Details thereof will be described below.

The steering roller 205 rotationally moves in the T directions in FIG. 4 about the rotation shaft 212 as a fulcrum. FIG. 10 is a diagram illustrating a state where the steering roller 205 rotationally moves in a T1 direction. The receiving member 230 receives the oil S dripping down from the scraping member 221 and the drip member 222. Thereafter, for example, the steering roller 205 rotationally moves in the T1 direction by an angle A on the drawing surface of FIG. 10 in a state where the receiving member 230 is receiving the oil S. Thus, the oil S can flow downward in the vertical direction. In other words, when the central portion of the belt 201 in the width direction is specified as a reference, the oil S flows toward the central portion from the end portion. Thus, the oil S moves to be uniform in the receiving member 230 in the width direction. FIG. 11 is a diagram illustrating a state where the steering roller 205 rotationally moves in a T2 direction. Similar to the state illustrated in FIG. 10, the oil S moves toward the central portion thereof. With this configuration, the oil S can favorably be received by the receiving members 230. Further, the receiving members 230 according to the present exemplary embodiment are arranged at both end portions of the belt 201 while each of the receiving members 230 extends toward the central portion in the width direction. In the present exemplary embodiment, since the oil S flows toward the central portion in the width direction, it is desirable that each of the receiving members 230 extend toward the central portion. Further, the receiving members 230 arranged at the both end portions may be a single member.

According to the present exemplary embodiment, the scraping member 221 of the collection mechanism 220 scrapes the oil S. The scraped oil S is collected by the receiving member 230 via the drip member 222. With this configuration, a path for favorably collecting the oil S applied to the inner portion of the belt 201 can be established, so that it is possible to prevent the oil S from leaking to the outer surface of the belt 201.

In the present exemplary embodiment, the collection mechanism 220 is described as a single component. However, the same effect can also be acquired by a collection mechanism 220 formed of a plurality of members as long as the positional relationship described in the present exemplary embodiment is followed thereby. Further, for example, the same effect can also be acquired by a collection mechanism 220 formed of a bar-shape member.

Now, the belt 201 reciprocating in the width direction and operations of the collection mechanisms 220 according to the present exemplary embodiment will be described with reference to FIG. 5A to FIG. 8B.

Figure 6B:
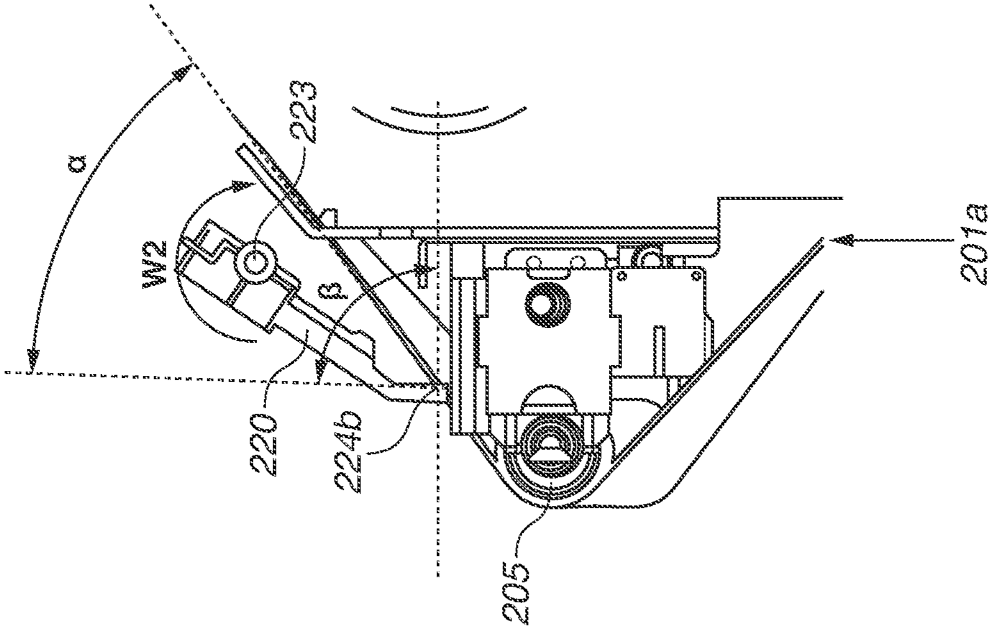
FIGS. 6A and 6B are diagrams illustrating one end of the heating unit according to one exemplary embodiment.
Figure 6A:
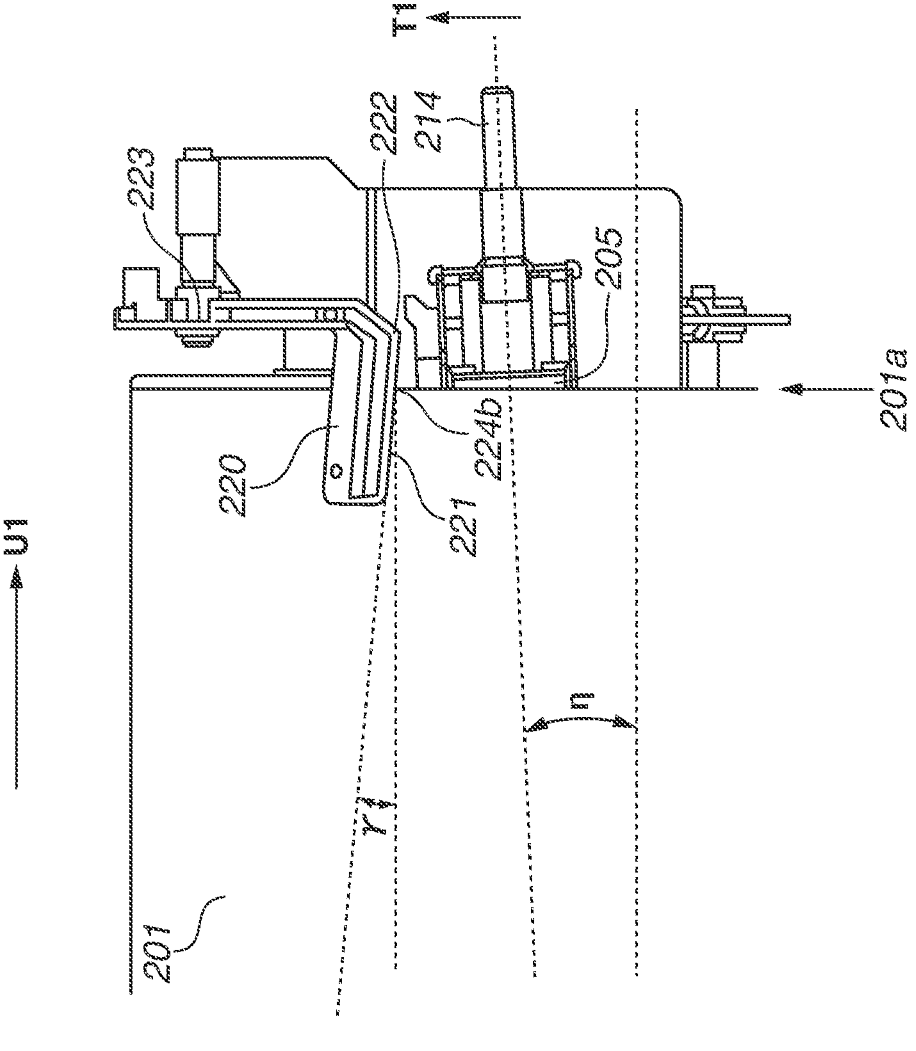

FIG. 5A is a diagram illustrating one end of the heating unit 210 viewed in the conveyance direction when the belt 201 starts moving in a U1 direction. FIG. 5B is a cross-sectional diagram of the heating unit 210 in FIG. 5A, viewed in the width direction orthogonal to the conveyance direction. Further, FIG. 6A is a diagram illustrating one end of the heating unit 210 viewed in the conveyance direction when the belt 201 has moved in the U1 direction from the state illustrated in FIG. 5A. FIG. 6B is a cross-sectional diagram of the heating unit 210 in FIG. 5A viewed in the width direction orthogonal to the conveyance direction.

The fixing apparatus 200 described in the present exemplary embodiment operates a steering shaft 214 fixed to the steering frame 213 in the T directions by a lifting unit (not illustrated) to make the steering roller 205 rotate by a rotation angle η° about the rotation shaft 212 as a center. As a result, the alignment of members around which the belt 201 is stretched is changed, so that the belt 201 is moved in U directions, i.e., the width direction, by being rotated in the R direction, i.e., the rotation direction, of the belt 201. Specifically, the belt 201 is moved in the U1 direction when the steering shaft 214 is operated in the T1 direction, and the belt 201 is moved in a U2 direction when the steering shaft 214 is operated in the T2 direction.

When the steering shaft 214 is moved in the T1 direction, the belt 201 follows the movement and moves in the T1 direction. At this time, the rotation angle η° of the steering roller 205 is inclined in a counterclockwise (CCW) direction by 2.5 degrees with respect to the horizontal direction.

In conjunction with the movement of the belt 201 in the width direction, the scraping member 221 of the collection mechanism 220 is rotated in a W1 direction by its own weight about the supporting member 223 as a center. With this configuration, the scraping member 221 can maintain the contact state with respect to an edge portion 201*a* on the outer surface side of the belt 201. When the belt 201 is moved in the U1 direction, the collection mechanism 220 is rotated in a W2 direction, so that a contact portion where the scraping member 221 is in contact with the belt 201 shifts from a position 224*a* in FIG. 5A to a position 224*b* in FIG. 6B.

At this time, the first angle is changed to 49.9 degrees from 50.8 degrees, and the second angle is changed to 86.8 degrees from 87.5 degrees, so that the scraping member 221 can scrape the oil S on the outer surface side of the belt 201 in a direction toward the inner circumference of the belt 201. Further, the third angle becomes 5.0 degrees, and the drip member 222 maintains its position on the lower side in the vertical direction of the scraping member 221. With this configuration, the oil S scraped by the scraping member 221 can be guided to the drip member 222 while preventing adherence thereof to the outer surface of the belt 201.

Figures 7A, 7B:
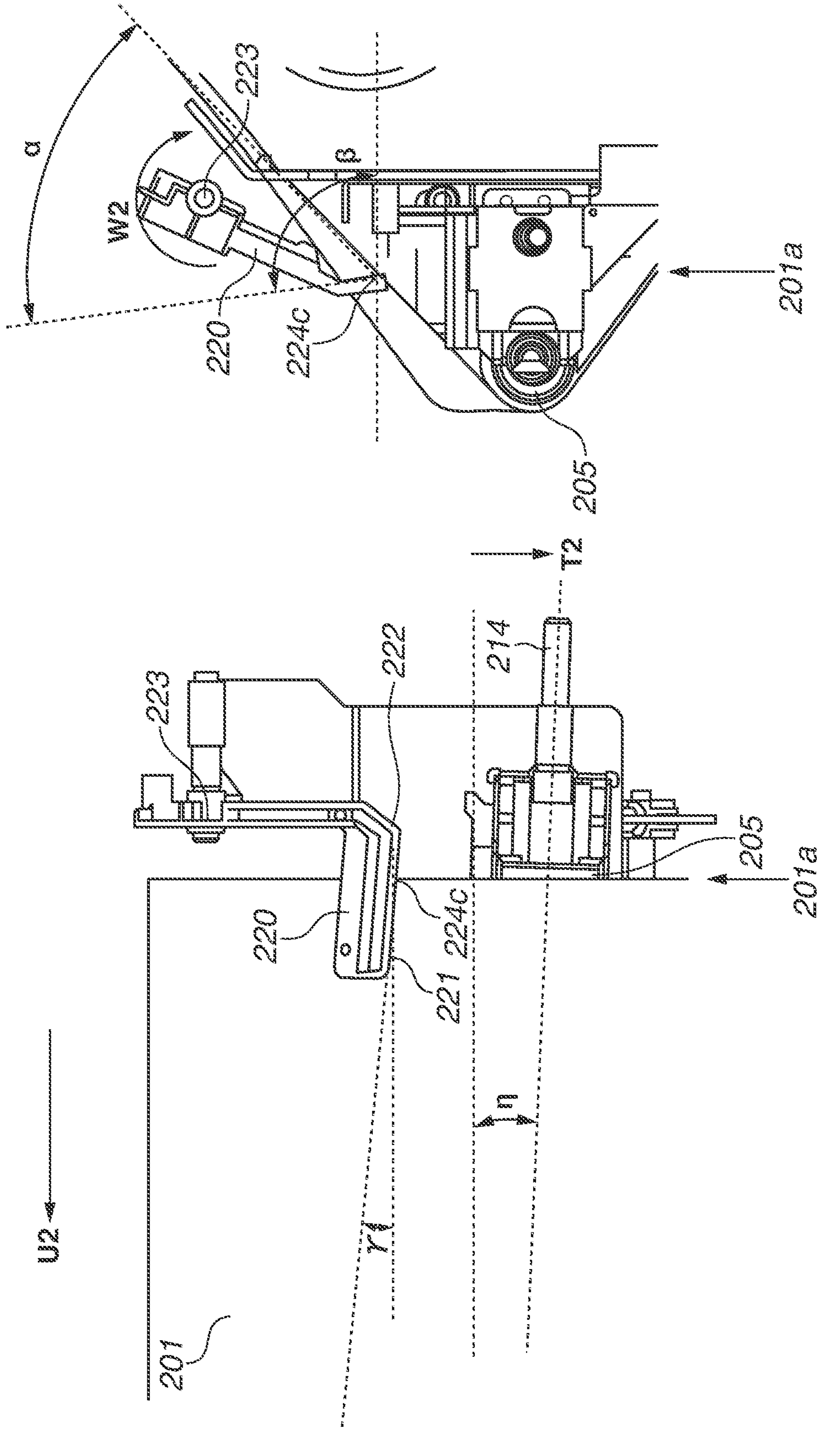
FIGS. 7A and 7B are diagrams illustrating one end of the heating unit according to one exemplary embodiment.
Figure 8B:
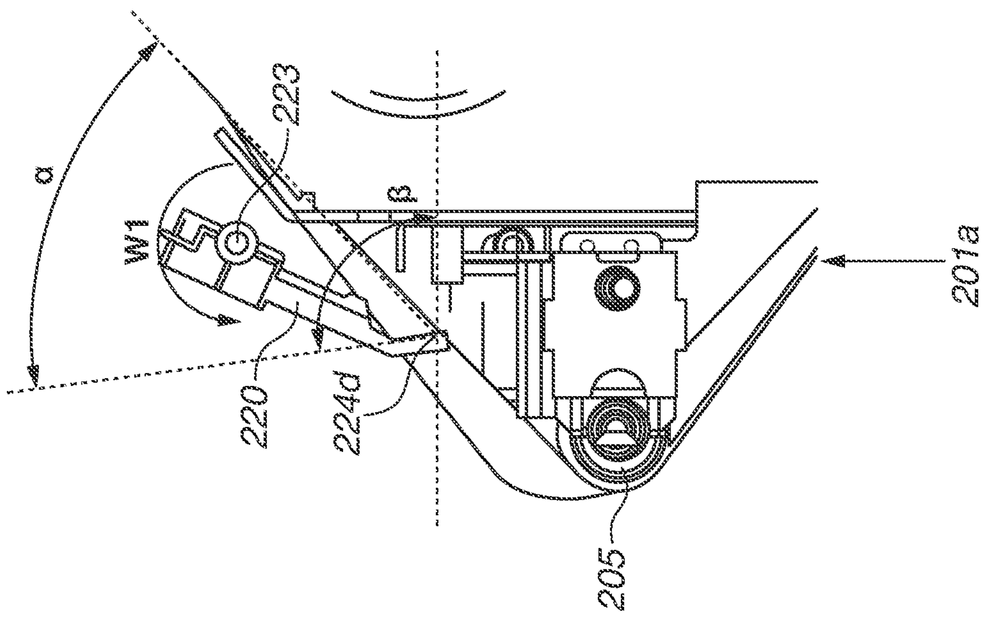
FIGS. 8A and 8B are diagrams illustrating one end of the heating unit according to one exemplary embodiment.
Figure 8A:
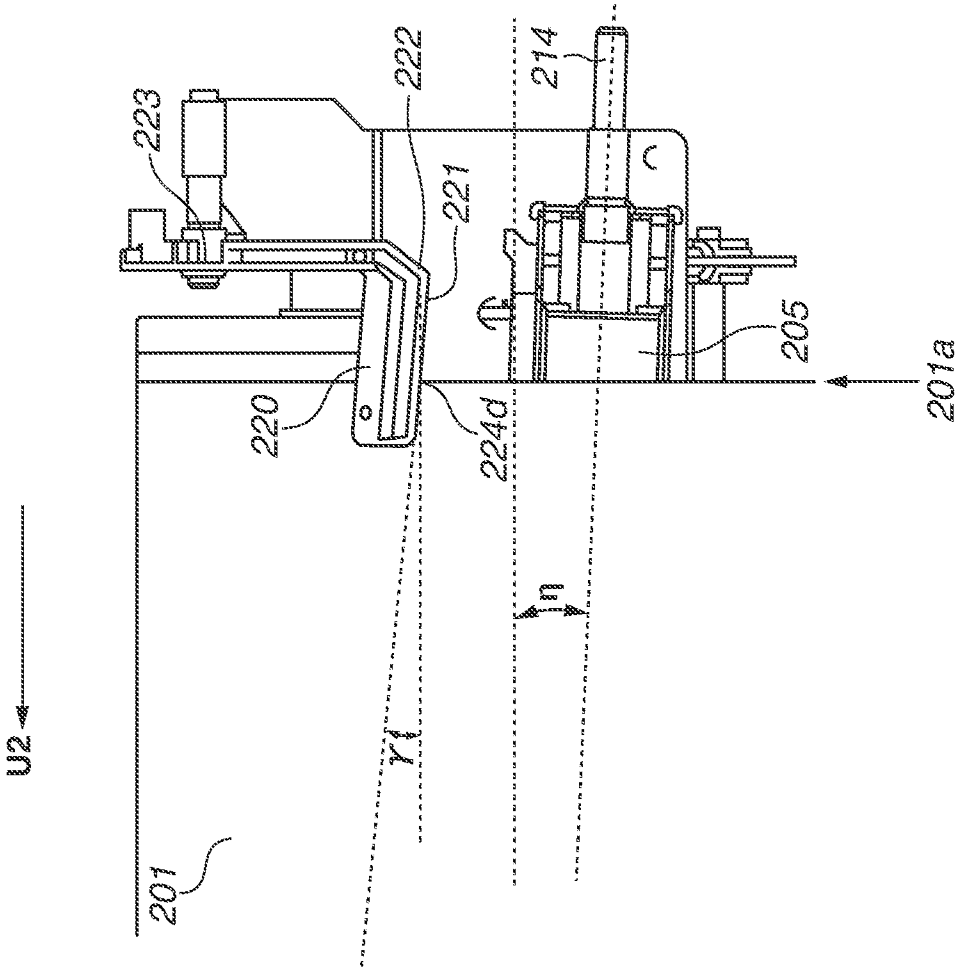

FIG. 7A is a diagram illustrating one end of the heating unit 210 viewed in the conveyance direction when the belt 201 starts moving in the U2 direction. FIG. 7B is a cross-sectional diagram of the heating unit 210 in FIG. 7A viewed in the width direction. FIG. 8A is a diagram illustrating one end of the heating unit 210 viewed in the conveyance direction when the belt 201 has completed the move in the U2 direction from the state illustrated in FIG. 7A. FIG. 8B is a cross-sectional diagram of the heating unit 210 in FIG. 7A viewed in the width direction.

When the steering shaft 214 is moved in the T2 direction, the belt 201 follows the movement and moves in the T2 direction. At this time, the rotation angle η° of the steering roller 205 is inclined in a clockwise (CW) direction by 2.5 degrees with respect to the horizontal direction.

At this time, in conjunction with the movement of the belt 201, the collection mechanism 220 is rotated in the W2 direction about the supporting member 223 as a center, so that the scraping member 221 can maintain the contact state with respect to the edge portion 201*a* on the outer surface side of the belt 201 (see FIGS. 7A and 7B). Further, when the belt 201 is moved in the U2 direction (see FIGS. 8A and 8B), the collection mechanism 220 is rotated in the W1 direction, so that a contact portion where the scraping member 221 is in contact with the belt 201 shifts from a position 224*c* in FIG. 7A (7B) to a position 224*d* in FIG. 8A (8B).

At this time, the first angle is changed to 49.2 degrees from 53.8 degrees, and the second angle is changed to 96.9 degrees from 96.3 degrees, so that the scraping member 221 can scrape the oil S on the outer surface side of the belt 201 in a direction toward the inner circumference of the belt 201. Further, the third angle becomes 5.0 degrees, and the drip member 222 maintains its position on the lower side in the vertical direction of the scraping member 221. With this configuration, the oil S scraped by the scraping member 221 can be guided to the drip member 222 while preventing adherence thereof to the outer surface of the belt 201.

In the present exemplary embodiment, the collection mechanisms 220 are arranged to come into contact with the edge portions 201*a* on the outer surface sides of the belt 201 stretched around the stretching members of the belt 201, i.e., the heating roller 204 and the steering roller 205. Thus, the drip members 222 can be arranged at positions on the outer sides of the belt 201 in the width direction and on the lower sides in the vertical direction of the scraping members 221. With this configuration, the oil S moving toward the drip members 222 from the scraping members 221 is guided to the outer sides of the belt 201 in the width direction, so that it is possible to prevent the collected oil S from adhering to the outer surface of the belt 201.

Figure 12A:
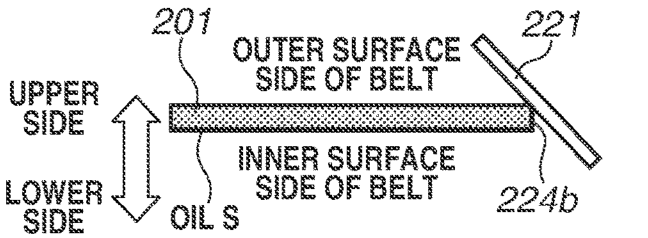
FIGS. 12A, 12B, 12C, and 12D are diagrams illustrating an effect of one exemplary embodiment.
Figure 12B:
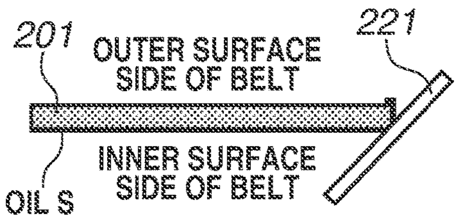
Figure 12C:
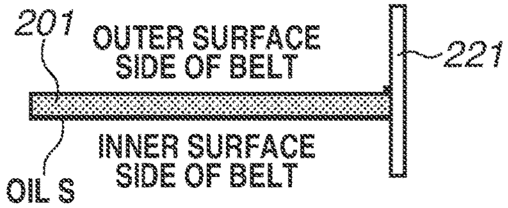
Figure 12D:
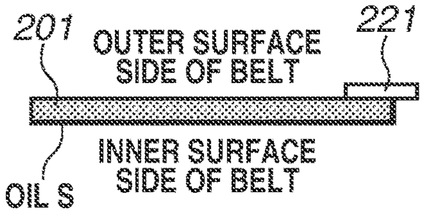

The effect of the present exemplary embodiment will be described with reference to FIGS. 12A, 12B, 12C, and 12D. FIGS. 12A, 12B, 12C, and 12D are cross-sectional diagrams of the belt 201 viewed in the conveyance direction of the recording material P. A two-headed arrow in FIG. 12A indicates an upper side and a lower side in the vertical direction. As illustrated in FIG. 12A, in the present exemplary embodiment, a scraping member 221 of the collection mechanism 220 is in contact with the belt 201 on the outer surface side of the belt 201. FIG. 12B illustrates a configuration of the scraping member 221 extending toward the lower side in the vertical direction toward the inner side of the belt 201 in the width direction. FIG. 12C illustrates a configuration of the scraping member 221 which is in contact with the belt 201 perpendicularly. FIG. 12D illustrates a configuration of the scraping member 221 which is in contact with the belt 201 in the width direction.

In FIG. 12B, the scraping member 221 is in contact with the belt 201 on an inner surface side of the belt 201. Thus, it is not possible to scrape the oil S flowing into the outer surface side of the belt 201. Similar to FIG. 12B, in FIG. 12C, it is not possible to scrape the oil S flowing into the outer surface side of the belt 201 because the scraping member 221 is in contact with the belt 201 perpendicularly. Further, in FIG. 12D, it is possible to scrape the oil S flowing into the outer surface side of the belt 201. However, the scraping member 221 is not formed into a shape extending toward the lower side in the vertical direction toward the outer side of the belt 201 in the width direction. Thus, it is difficult to allow the oil S to drip down from the belt 201 to the outer side of the belt 201. Further, because the scraping member 221 is in contact with the belt 201 in the width direction of the belt 201, an area where the scraping member 221 is in contact with the belt 201 is large. Therefore, the belt 201 is damaged easily, so that the lifetime thereof is shortened.

Since the scraping member 221 in FIG. 12A extends to the lower side in the vertical direction toward the outer side of the belt 201, it is possible to make the scraped oil S drip down on the outer side of the belt 201. Further, because the scraping member 221 is in contact with the belt 201 on the outer surface side of the belt 201, the scraping member 221 can scrape the oil S flowing into the outer surface side of the belt 201.

By using the collection mechanism 220 according to the present exemplary embodiment, it is possible to make the scraping member 221 favorably follow the movement of the belt 201 and the movement of the steering roller 205 serving as the stretching member of the belt 201. With this configuration, the scraping member 221 can maintain a positional relationship with the drip member 222 while maintaining the contact state with respect to the edge portion 201*a* on the outer surface side of the belt 201.

According to the configuration described in the present exemplary embodiment, the supporting member 223 is a rotation axis of the scraping member 221.

The rotation axis of the scraping member 221 is arranged to intersect with the rotation axis in a direction (i.e., T directions in FIG. 4) in which the steering roller 205 is rotated by the steering shaft 214. It is assumed that the rotation axis of the steering roller 205 rotating in the T directions to change the position of the belt 201 in the width direction is parallel to the rotation axis of the scraping member 221. In other words, it is assumed that the rotation axis of the scraping member 221 is parallel to the conveyance direction. In this case, a variation amount of the third angle (angle γ) formed between the belt 201 and the scraping member 221 is increased along with the rotation of the scraping member 221. The operation amount of the scraping member 221 becomes great compared to the case where the rotation axes intersect with each other. On the other hand, according to the configuration described in the present exemplary embodiment in which the rotation axes intersect with each other, an installation space of the scraping member 221 can be reduced in the width direction compared to the case where the rotation axes are parallel to each other.

In the present exemplary embodiment, the collection mechanism 220 is rotated by its own weight to follow the movement of the belt 201. However, the collection mechanism 220 may be brought into contact with the belt 201 by being urged by a spring at light pressure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-005616, filed Jan. 18, 2022, No. 2022-005615, filed Jan. 18, 2022, and No. 2022-172751, filed Oct. 27, 2022, which are hereby incorporated by reference herein in their entirety.

What is claimed is:

1. A fixing apparatus comprising:

a rotatable endless belt;

a pad configured to come in contact with an inner circumferential surface of the rotatable endless belt;

a pressing rotary member configured to come in contact with the pad via the rotatable endless belt to form a nip portion, wherein, in cooperation with the rotatable endless belt, the pressing rotary member applies heat and pressure to a recording material which bears a toner image at the nip portion to fix the toner image to the recording material, and wherein a lubricant is applied to the inner circumferential surface of the rotatable endless belt; and a scraping member configured to scrape the lubricant by being in contact with an edge portion of the rotatable endless belt in a width direction, wherein the scraping member includes an inclined portion inclined relative to the rotatable endless belt in the width direction, and wherein the inclined portion is opposed to an outer surface of the rotatable endless belt.

2. The fixing apparatus according to claim 1, further comprising a heating roller that is in contact with the inner circumferential surface of the rotatable endless belt and configured to apply heat to the rotatable endless belt.

3. The fixing apparatus according to claim 1, further comprising a steering roller configured to swing the rotatable endless belt to move the rotatable endless belt to a predetermined position in the width direction depending on a detection result.

4. The fixing apparatus according to claim 3, further comprising a heating roller that is in contact with the inner circumferential surface of the rotatable endless belt and configured to apply heat to the rotatable endless belt, wherein the nip portion, the heating roller, and the steering roller are arranged in this order in a rotation direction of the rotatable endless belt, and the scraping member is arranged between the heating roller and the steering roller.

5. The fixing apparatus according to claim 3, further comprising a supporting member configured to movably support the scraping member to maintain a state where the scraping member is in contact with the rotatable endless belt in a case where a position of the rotatable endless belt in the width direction is changed by the steering roller.

6. The fixing apparatus according to claim 5, wherein the scraping member rotates about the supporting member, and a rotation axis direction in which the scraping member rotates is a rotation axis direction of a pressurizing rotary body.

7. The fixing apparatus according to claim 3, further comprising:

a frame configured to support both end portions of the steering roller, wherein the frame is configured to swing the steering roller to move the rotatable endless belt to the predetermined position; and a receiving member fixed to the frame and configured to receive the lubricant scraped by the scraping member.

8. The fixing apparatus according to claim 1, further comprising a receiving member configured to receive the lubricant scraped by the scraping member, wherein the receiving member is positioned on a lower side in a vertical direction of the inclined portion.

9. The fixing apparatus according to claim 8, wherein the receiving members includes a felt member.

10. The fixing apparatus according to claim 9, wherein part of the receiving member is arranged on an outer side of the rotatable endless belt in the width direction.

11. The fixing apparatus according to claim 9, wherein, in a case where the receiving member is viewed in the width direction, the receiving member is arranged on an inner side of the rotatable endless belt.

12. The fixing apparatus according to claim 1, wherein, in a case where the scraping member is viewed in the width direction, an angle between the outer surface of the rotatable endless belt and the scraping member is 0 degrees or more and 90 degrees or less.

13. The fixing apparatus according to claim 1, wherein scraping members are arranged at both end portions of the rotatable endless belt in the width direction.

14. The fixing apparatus according to claim 1, wherein the scraping member includes a drip portion on an outer side of the rotatable endless belt, and wherein, in a case where a contact portion where the edge portion of the rotatable endless belt is in contact with the inclined portion of the scraping member is specified as a reference, the drip portion is positioned on a lower side in a vertical direction.

15. The fixing apparatus according to claim 1, wherein the lubricant is oil, the fixing apparatus further comprising an application roller configured to apply the oil to the inner circumferential surface of the rotatable endless belt.

* * * * *